June 5, 1962  W. F. HENRY ET AL  3,037,696
TOLL HIGHWAY RECORDER
Original Filed Dec. 15, 1953  8 Sheets-Sheet 1

INVENTORS
WILLIAM F. HENRY
JOSEPH J. PURCELL
BY
AGENT

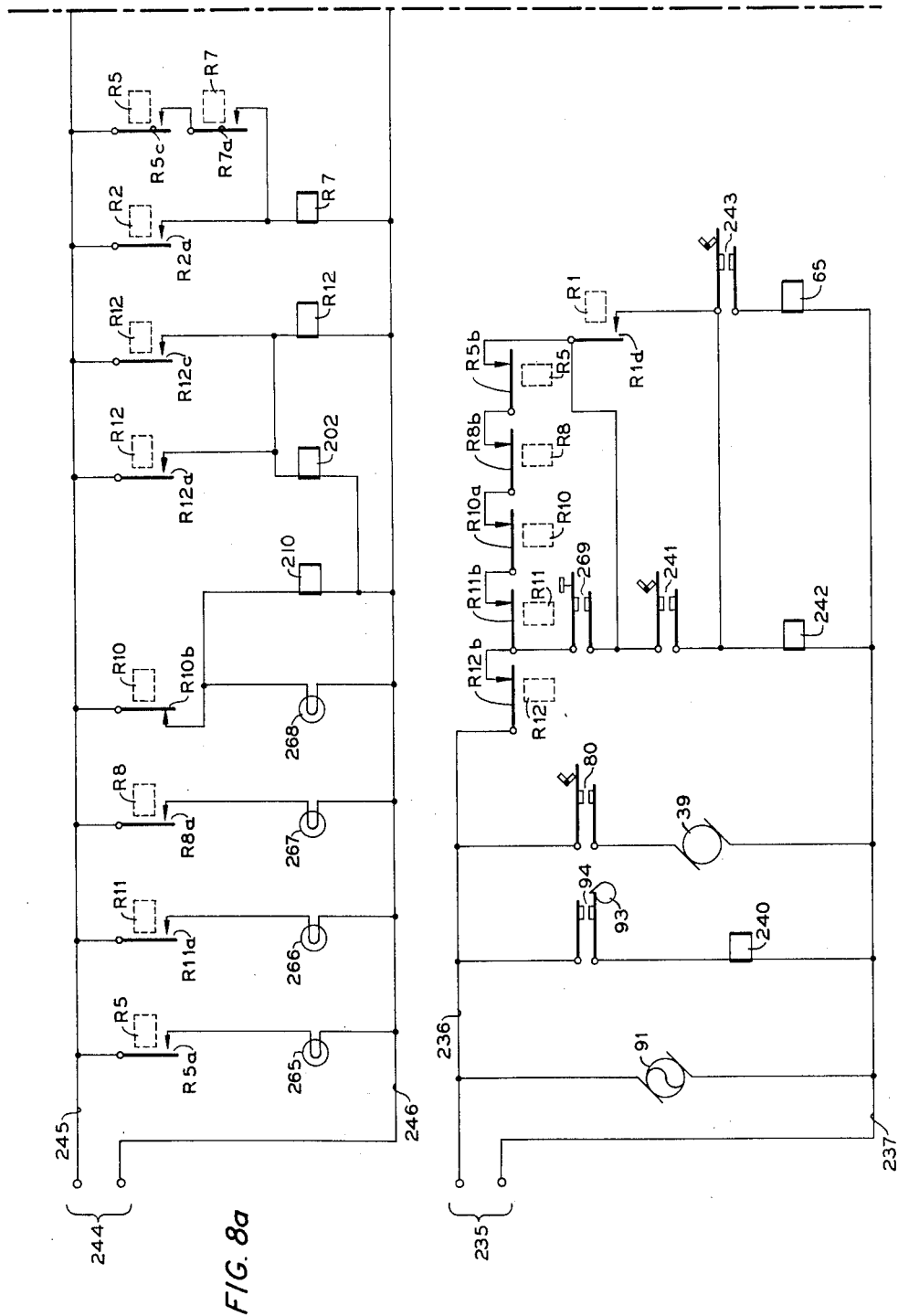

3,037,696
TOLL HIGHWAY RECORDER
William F. Henry, Endicott, and Joseph J. Purcell, Endwell, N.Y., assignors to International Business Machines Corporation, New York, N.Y., a corporation of New York
Original application Dec. 15, 1953, Ser. No. 398,358, now Patent No. 2,947,591, dated Aug. 2, 1960. Divided and this application Sept. 14, 1959, Ser. No. 26,390
11 Claims. (Cl. 235—99)

This invention relates to toll highway recorder apparatus for recording information relating to vehicles entering and leaving a toll highway. This a division of our original application Serial No. 398,358, filed December 15, 1953, now Patent No. 2,947,591.

Success of the famous Pennsylvania Turnpike, first of the truly modern "pay-by-the-mile" toll highways, has created a tremendous interest in the operation of toll highways. Further success of such highways is assured only so long as the public in general, and vehicle operators in particular, are convinced that well constructed toll highways offer the right to extra vehicle speed, comfort, safety and economy. This economy relates not only to direct vehicle operational costs such as the cost of gasoline, for example, but also to the expense of building the toll roads. Obviously, toll roads are now in being because the public in general believes it is those persons who directly make use of the roads that should pay a just toll for the privilege of operating vehicles over the same.

Good business demands wise economy which, in turn, calls for accurate records. As will be described in detail hereinafter, the embodiment of this invention provides accurate information, relating to vehicles passing over a toll highway, for recording on trip, or fare, cards whereupon dishonest practices and/or unintentional errors are readily detected. Each trip card is associated with a vehicle passing over the toll highway, and, since each trip card is the well-known IBM record card, accounting procedures are greatly simplified because the trip cards can be used subsequently to control the well-known IBM accounting machines.

The general object of this invention is to provide an improved toll highway recorder for recording accurate information relating to vehicles passing over the highway.

In line with the foregoing object, another object of this invention is to provide a toll highway recorder having improved means to detect intentional dishonest practices and/or unintentional errors.

In the embodiment of this invention, a toll recorder is installed in a toll, or vehicle stop, booth in which the toll collector is stationed. A treadle for counting vehicle axles is located in the roadway a few feet beyond the toll booth opposite which the vehicles must first stop. A directional relay unit associated with the treadle distinguishes between axles passing over the treadle in a forward direction and in a reverse direction in order to be able to provide a record of both counts separately.

When a vehicle is stopped opposite the toll booth, the toll collector determines the number of axles on the vehicle. This value is set up manually in the toll recorder by the toll collector so that after a trip card corresponding to the aforesaid vehicle is inserted in the recorder card receiver, this number of axles value is recorded upon the trip card.

As the vehicle leaves the toll booth, the aforementioned treadle circuit causes the actual axle count, as determined by the axle treadle, to be entered in an accumulator in the toll recorder, thereby checking the axle count set up manually by the toll collector. The two axle counts should agree, of course, so as to indicate that the determination made by the toll collector is correct. If there is a difference between the two counts, however, this difference is recorded on the following trip card prior to being automatically cleared.

The axle count difference referred to hereinabove is recorded on a subsequent trip card because the trip card associated with the vehicle in point is processed prior to passage of the vehicle over the treadle. The treadle is preferably situated beyond the toll booth because the passage of vehicles over the treadle may be controlled more readily. It is apparent that if the axle treadle were situated ahead of the toll booth, the passage of vehicles over the treadle, particularly during rush periods, might not be associated very readily with related trip cards. This, of course, is for the reason that the wheelbase length of various vehicles differs.

Accordingly, another object of this invention is to provide a vehicle axle count verifying apparatus.

Still another object of this invention is to provide an axle count accumulator for resolving a difference value between an axle count determined by a toll collector and the actual axle count.

A still another object of this invention is to provide a toll recorder for recording a vehicle axle error count on a trip card processed following passage of the vehicle over a treadle.

In the past, an effort has been made to get around an axle treadle whereby the actual axle count is determined, by weighting the treadle. This is commonly referred to as "sandbagging" the treadle because a sandbag is quite often used to maintain the treadle in an operated condition. Thus, when the treadle is weighted, any number of vehicle axles may pass over the treadle without being counted.

Accordingly, another object of this invention is to provide a toll highway recorder apparatus for detecting and recording that an axle treadle is weighted.

Quite often an effort is made to "beat" the toll highway authority by interrupting the electrical power supply to the recorder, thereby rendering the entire toll highway recorder apparatus ineffective.

Accordingly, another object of this invention is to provide a toll highway recorder apparatus for recording the application of electrical power to said apparatus.

Another object of this invention is to provide a toll highway recorder apparatus for recording an electrical power supply interruption condition upon the first trip card processed after this condition is corrected.

Most axle count printing sectors have a limit of seven axles because of the extremely few, if any, vehicles having more than seven axles. Thus, by simply failing to process a trip card whereby the printing sectors are reset, any number of vehicles can pass over the treadle, and the sectors will indicate only the maximum number of six axles.

Accordingly, another object of this invention is to provide a toll highway recorder apparatus for recording error data consequently upon a number of vehicle axles in excess of a predetermined number of axles passing over an axle treadle in a forward and/or a reverse direction.

Other objects of this invention will be pointed out in the following description and claims, and illustrated in the accompanying drawings, which disclose by way of example, the principle of the invention and the best mode, which has been contemplated, of applying that principle.

Figure 8B:
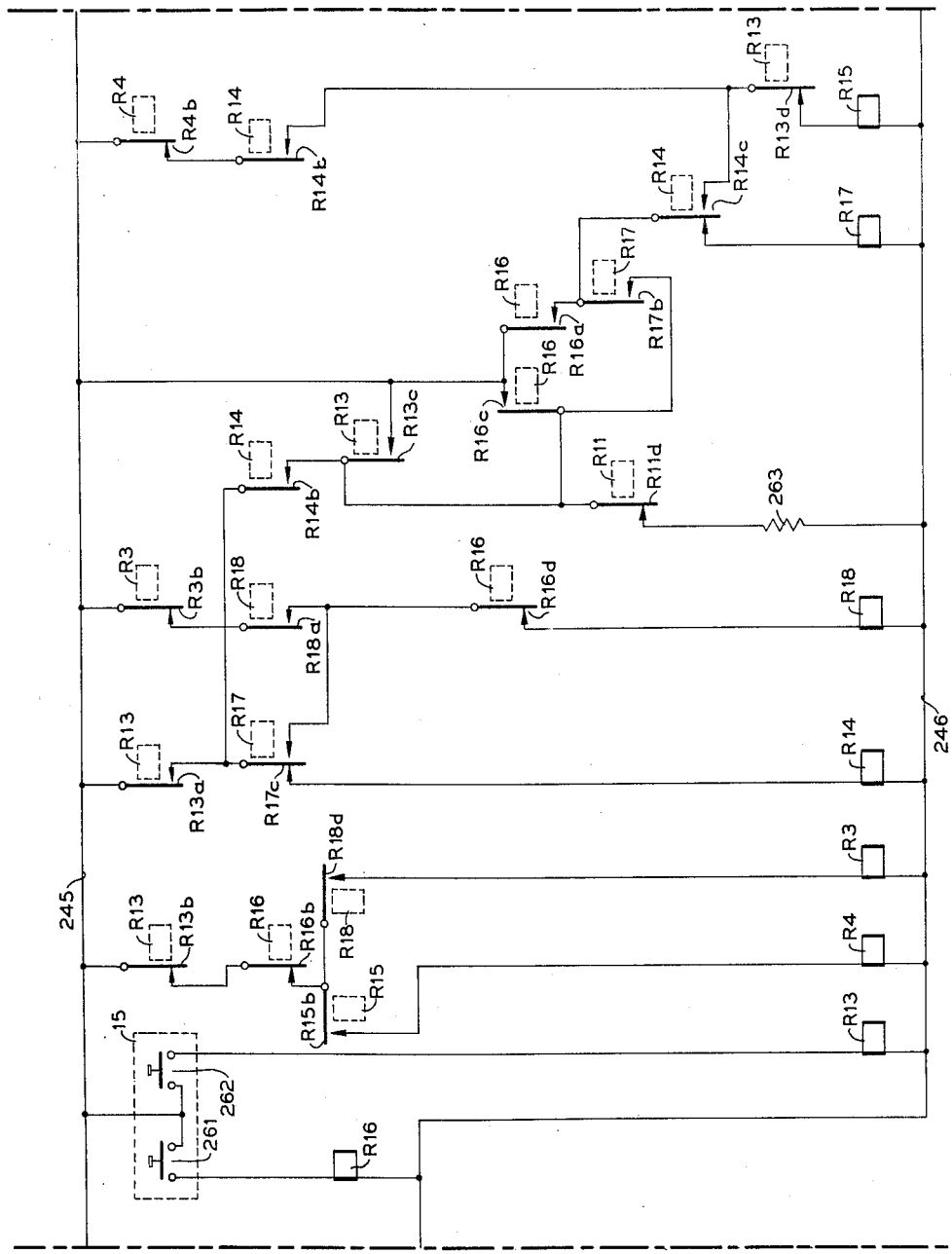
Figure 8C:
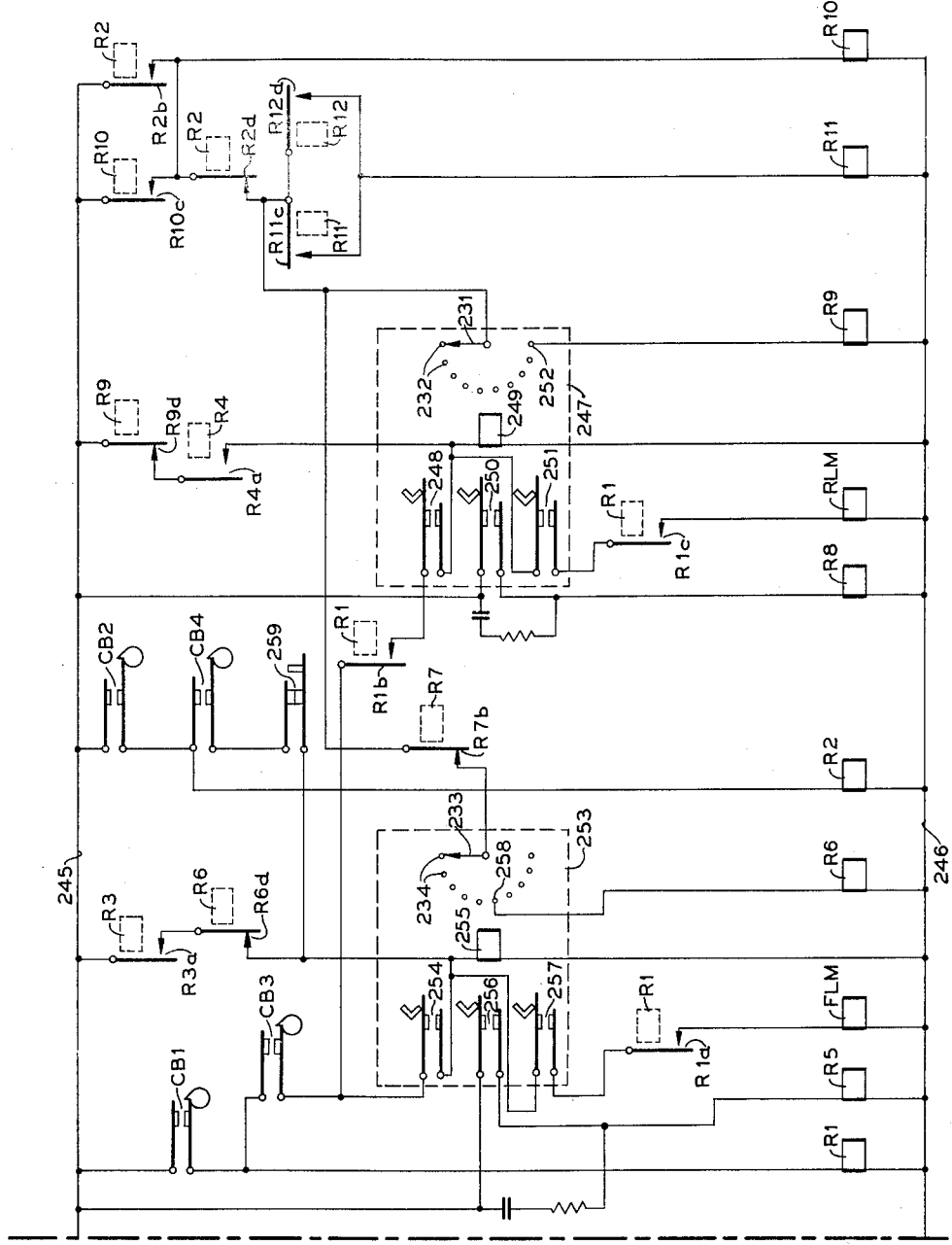

FIGS. 8a, 8b, and 8c, taken together, constitute a wiring diagram of the machine.

*General Description*

Prior to describing the various mechanical and electrical components of the instant invention which cooperate to afford a workable and effective toll highway recorder apparatus, the same will first be described briefly and in a general way so as to present an explanation of the over-all operation of the apparatus.

A toll highway recorder system includes at least two terminals, one a vehicle entrance station and the other a vehicle exit station. Since the embodiment of this invention can be used at either a vehicle entrance station or an exit station, only a single toll recorder highway apparatus is shown in block form in FIG. 1.

Figure 1:
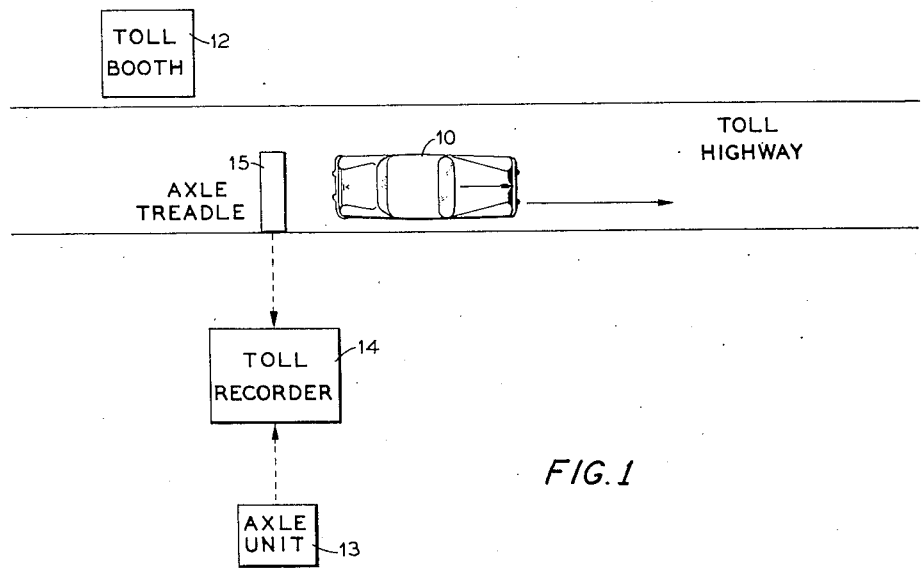
FIG. 1 is a block diagram of a toll highway recording apparatus at a highway terminal.
Figure 2:
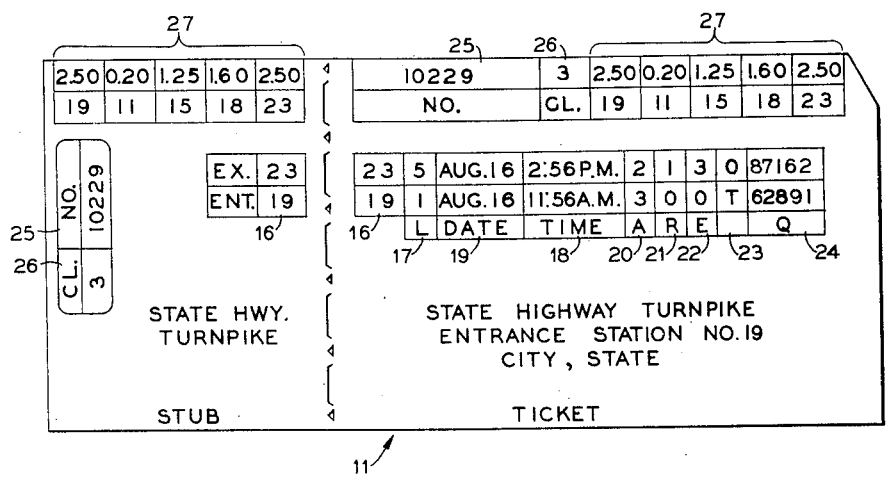
FIG. 2 is a view of the trip card.

Assuming first that the apparatus shown in FIG. 1 is situated at a vehicle entrance station, a vehicle 10 which is entering the toll highway must first be stopped at the entrance station so that specific information relative to toll recording may be entered upon a trip card 11 (see also FIG. 2). This vehicle is stopped opposite toll booth 12 for examination by the toll collector, whereupon the latter determines the classification of the vehicle. The classification of different types of vehicles is preferably outlined by the governmental authority which controls the operation of the toll highway. This authority may, for example, assign a classification 1 to all passenger vehicles whose manufacturer's or licensing, weight is under 3500 pounds, an a classification 2 to all passenger vehicles whose weight is over 3500 pounds. The authority may determine that lightweight delivery trucks, for example the so-called quarter ton pick-up trucks, are in classification 3, etc.

The toll collector at the entrance station is supplied with different classes of trip cards, each class corresponding to a distinct classification number. This is desirable because the vehicle classification is a partial determining factor of the toll paid by a vehicle operator for the privilege of passing over the highway. As the description advances, this will be described in detail.

In addition to determining the classification of the vehicle, the toll collector manually sets up an axle count in unit 13, which corresponds to the number of axles on vehicle 10. In the preferred embodiment of this invention, provision is made to accommodate vehicles having two through seven axles.

The toll collector next obtains a trip card 11 of a class corresponding to the vehicle classification from a convenient card rack for insertion into the card receiver of the toll recorder 14. As is shown in FIG. 2, trip card 11 has the general appearance of the well-known IBM tabulating record card. Complete insertion of the trip card will render electric circuits operative which cause the following information to be recorded upon the card at the line labeled "ENT.":

(1) The entrance station terminal number in columns 16.

(2) The lane number in column 17 to indicate the lane through which vehicle 10 passes to enter the toll highway.

(3) The time in column 18 and the day in column 19 at which the trip card has the information entered thereupon.

(4) The number of vehicle axles in column 20 set up in manually settable unit 13.

(5) The number of axles in column 21 to indicate the number of axles (carried by a preceding vehicle) crossing treadle 15 in a reverse direction.

(6) An axle error count in column 22 depicting the difference between the actual number of axles on the vehicle preceding vehicle 10 crossing the treadle 15 and the number of axles set up in unit 13 for the preceding vehicle.

(7) A power failure "P," or a weighted treadle "T," or a properly functioning recorder "O," in column 23.

(8) A toll recorder operation sequence count in column 24.

As is shown in FIG. 2, the trip card also has imprinted thereon at both ticket and stub portions, the following information:

(1) Trip card sequence number in columns 25.

(2) Vehicle classification number in columns 26.

(3) The toll amount in columns 27 due when vehicle 10 leaves the toll highway at one of the designated exit stations.

After the trip card is processed in recorder 14, the trip card is removed from the card receiver and placed into the custody of the vehicle operator. The operator is then permitted to leave the entrance station in order to pass over the highway towards his destination at which the exit station is located. Prior to entering the toll highway proper, however, vehicle 10 passes over the axle treadle 15. The number of axles passing over the treadle in a forward direction, i.e., in a direction towards the highway, are accumulated in a forward axle counter. In the event the vehicle is moved over the treadle in a reverse direction after having passed over the treadle in a forward direction, the number of axles passing over the treadle in a direction away from the highway are accumulated in a reverse axle counter. Both of the afore-mentioned counters are located in toll recorder 14 for controlling printing upon trip card 11 of the information designated by reference numerals 21 and 22.

The number of axles passing over treadle 15 in a forward direction is compared with the axle count setup in unit 13 so as to provide an axles in error indication designated by reference numeral 22. The setup of this error information is as follows:

The selection in unit 13 of a number of axles causes the tens complement, or a subtractive, count of the vehicle axles set up to be entered in an axle count accumulator in toll recorder 14. The passage of vehicle 10 for which the axle unit was set up, over axle treadle 15 causes an additive count of the actual number of axles to be entered in the afore-mentioned accumulator. Of course, if the data representing the two axle counts are equal, the accumulator will have a zero total after vehicle 10 passes completely over treadle 15. If, however, one axle count is more or less than the other axle count, the axle count accumulator in toll recorder 14 will have a plus or minus total therein. It is apparent that since the trip card associated with vehicle 10 is processed before the vehicle passes over treadle 15, the axles in error indication in column 22, i.e., the axle count difference represented as a total in the axle count accumulator, cannot be entered upon the trip card associated with vehicle 10, but must be entered upon a trip card processed subsequent to the vehicle passing over the treadle. In the instant embodiment, the next card processed after the vehicle passes over the treadle is selected to have this information recorded thereon.

Assuming the toll highway recorder apparatus shown in FIG. 1 is situated at a vehicle exit station, vehicle 10 is stopped opposite toll booth 12 prior to passing over treadle 15. The vehicle is examined once again by an exit station toll collector whereupon the number of vehicle axles is determined for a second time. Thus, in accordance with the number of axles determined to be on the vehicle, the toll collector will manually set up an axle count in unit 13. Trip card 11 which was placed in the custody of the vehicle operator at the entrance station, is taken by the toll collector for insertion into the card receiver of exit station toll recorder 14. Complete insertion of the trip card into the card receiver will render the apparatus operative whereby the same type of information as is recorded at the entrance station, is recorded along the exit station at the line designated "EX."

After the trip card 11 for vehicle 10 is processed at the exit station, the toll collector determines the toll to be paid by the vehicle operator. This determination is made by referring to a toll chart comprising columns 27 imprinted upon the face of the trip card. The amount of the toll paid for the privilege of passing over the toll highway is selected from this chart simply by reading the amount designated above the exit station number. The amounts imprinted upon the trip card are initially determined by the toll highway authority on the basis of distance traveled over the toll highway by the vehicle operator, and the classification of the vehicle. This means, of course, that each entrance station must have assigned thereat particular classes of trip cards each of which is associated with the station.

Two types of irregular operation of a toll highway recorder apparatus are indicated on a trip card processed after the irregularity is corrected. These irregular operations are designated as a power supply interruption and a weighted-treadle. A power supply interruption will cause the letter "P" to be recorded in column 23 during the first recorder operation after power is restored. A weighted-treadle will cause the letter "T" to be recorded in column 23 until after the irregularity is corrected and during the first recorder operation after the weighted-treadle condition is corrected.

In addition to lighting a signal light in response to any one of the given irregularities, a toll recorder governing means is controlled so that a toll recorder operation is not automatic upon the insertion of a trip card into the card receiver. An error switch must be depressed so as to particularly call the attention of the toll collector to the irregularity.

The toll recorder also registers the toll collector's attendance time on an attendance card similar to trip card 11. For this function the axle selection lever in unit 13 is set to the "A" position (see also FIG. 5). This does not enter any axle count into the axle count accumulator in recorder 14. This does, however, register the time in column 18 (FIG. 2) and the date in column 19, in addition to an "A" for attendance in axles column 20. Any errors or reverse axle count that are in the recorder from a preceding vehicle are also recorded, as is the sequence number of recorder operation. Hence, when the toll collector registers his attendance at the beginning and the end of his daily work shift on the toll recorder which is assigned to him as his responsibility, the sequence numbers will identify all trip cards issued by the toll collector during his tour of duty.

*Drive Mechanism*

Figure 3:
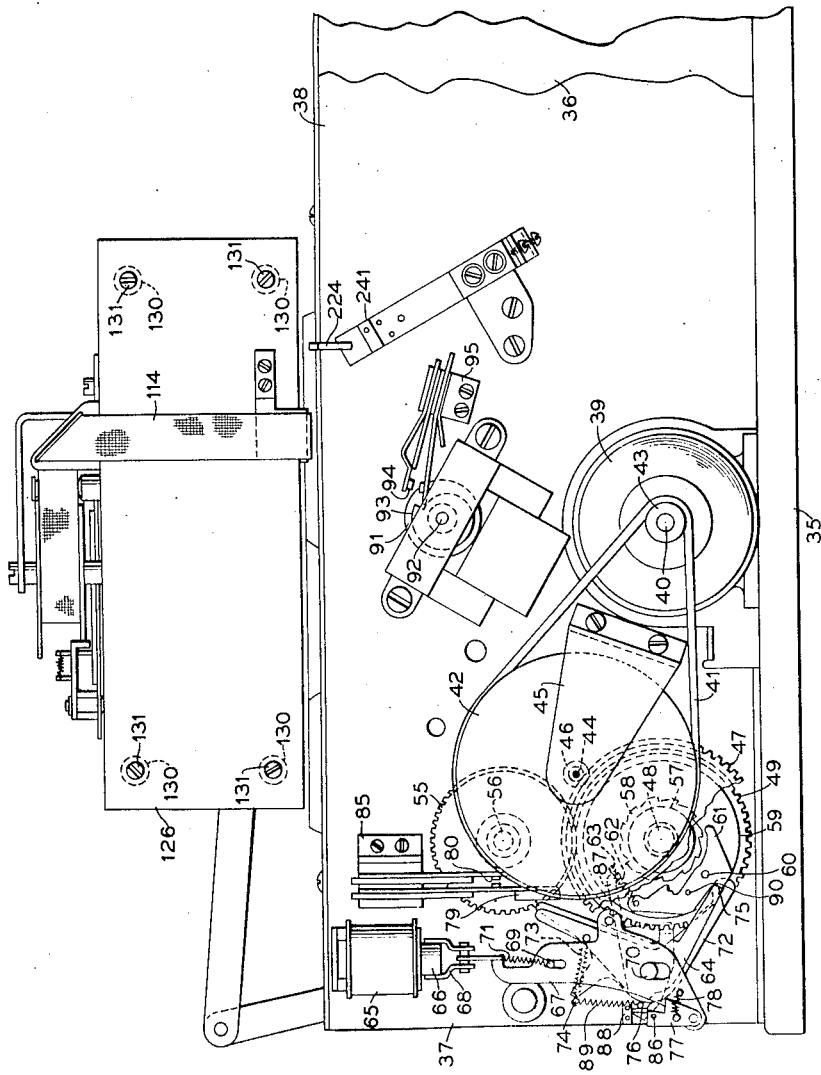
FIG. 3 is an elevational view of the toll recorder showing, in particular, the main drive mechanism.

Referring to FIG. 3, the lower half of the recorder mechanism is housed within a box-like structure comprising a base plate 35, a front plate 36, a rear plate 37 and a top plate 38. Looking at the back of the machine, as viewed in FIG. 3, there is shown supported on the base plate 35 a drive motor 39 having a drive shaft 40 which is adapted by means of a belt 41 and the pulleys 42, 43 to drive an auxiliary shaft 44 in a counterclockwise direction. The auxiliary shaft 44 is journaled in a bracket 45 fastened to rear plate 37. A gear 46 fastened to shaft 44 meshes with a large gear 47 rotatably mounted on a shaft 48 journaled in the front plate 36 and rear plate 37. On the shaft 48 is fastened a gear 49 which in turn meshes with a gear 55 fastened to a main cam shaft 56 journaled in the front plate 36 and rear plate 37.

The gear 47 is the driving element of a one revolution clutch and has fastened to a collar portion 57 thereof a ratchet wheel 58. Adjacent to the ratchet wheel 58 is a clutch positioning disc 59 which is pinned to the gear 49 and which pivotally supports, by means of a stud 60, a clutch engaging pawl 61. A spring 62 extending between one end of the pawl 61 and a stud 63 on the disc 59 urges the pawl clockwise for engagement with the ratchet wheel but the pawl is normally prevented from engaging said ratchet wheel by a clutch positioning lever 64 in a manner to be presently described.

To operate the clutch there is provided a solenoid mechanism which comprises a solenoid 65 suitably mounted on the rear plate 37 and having an armature 66 to which a clutch operating link 67 is connected by means of yoke member 68. The operating link 67 is mounted on studs 69, 70 for vertical movement with the solenoid core 66. A spring 71 extending beween the stud 69 and the upper end of operating link 67 maintains said link and the solenoid armature in their lower extended position (as shown in FIG. 3) when the solenoid is de-energized. Pivotally mounted on the stud 70 is the clutch positioning lever 64 and a bell crank lever 72. In the normal position of the mechanism a pair of adjacent springs 73 which extend between a pair of studs, one on the positioning lever 64 and the other on bell crank lever 72, and a stud 74 on the rear plate 37 bias said levers in a counterclockwise direction causing the rounded portion of one end of bell crank lever 72 to seat in a notch in the periphery of the clutch disc 59 and causing the extended portion 75 of positioning lever 64 to abut against the clutch pawl 61 and maintain same out of engagement with the ratchet wheel 58. An extended ear portion 76 of the positioning lever 64 also abuts against an interposer 77 which is pivotally attached to the lower extremity of the operating link 67 and spring biased against the edge of said link by a spring 78.

It may be seen that the upper extremities of the positioning lever 64 and the bell crank lever 72 lie adjacent an operating strap 79 of a pair of motor contacts 80 suitably mounted in block 85 attached to the rear plate 37. The motor contacts 80 control the operation of the drive motor 39 and are normally open to render the drive motor inoperative.

When solenoid 65 is energized, by electrical means to be later described, core 66 and operating link 67 will travel upward causing the interposer 77 to engage the ear 76 and drive the positioning lever 64 in a clockwise direction. As a result the upper extremity of the positioning lever will close the motor contacts 80 and the motor will operate to drive gear 47 and ratchet wheel 58. At the same time the lower extending portion 75 of the positioning lever will move away from the pawl 61 freeing said pawl for engagement with the ratchet wheel and completing the drive through the clutch disc 59, shaft 48 and gear 49 to the gear 55 and the main cam shaft 56. With the clutch disc 59 now rotating, the rounded portion on the lower extremity of said bell crank lever 72 rides onto the high portion of the periphery of the clutch disc and the bell crank lever will pivot in a clockwise direction so that its upper extremity will engage the closed motor contacts 80 and maintain them closed until the clutch disc 59 has made one complete revolution.

As the operating link 67 is being pulled upward by core 66, a pin 86 in the interposer 77 contacts the end surface of a release pawl 87 pivotally mounted on the stud 70 biased in a clockwise direction against a stop plate 88 by a spring 89, pushing the interposer 77 counterclockwise releasing the positioning lever 64. The extended portion 75 of the positioning lever 64 is thus again placed in the path of the pawl 61 to disengage the pawl from ratchet wheel 58 after one revolution. To insure proper disengagement of the interposer 77, the release pawl 87 is rotated counterclockwise by a stud 90 on gear 49 striking the extended portion of release pawl 87. As a result of the above mechanism it can be seen that shafts 48 and 56 and the cams attached thereto will make only one revolution. If for any reason solenoid 65 should remain energized longer than it should, the operating link 67 will remain in its raised position. However, since the positioning lever 64 has returned to its normal position, the interposer 77 still in the raised position cannot engage the extended ear portion 76 of lever 64 and therefore cannot operate it to close contacts 80.

Still referring to FIG. 3, it may be seen that the rear plate 37 also supports a synchronous motor 91. The shaft 92 of the motor has fastened thereto a single lobe cam 93 which will make one revolution per minute as long as power is turned on in the recorder to energize the synchronous motor. The single lobe cam 93 operates to close a pair of timer contacts 94 mounted in a block 95 which is also attached to the rear plate 37. The timer contacts 94 will close once each minute and are provided to advance the time and date printing members (not shown).

Printing Mechanism

Figure 4:
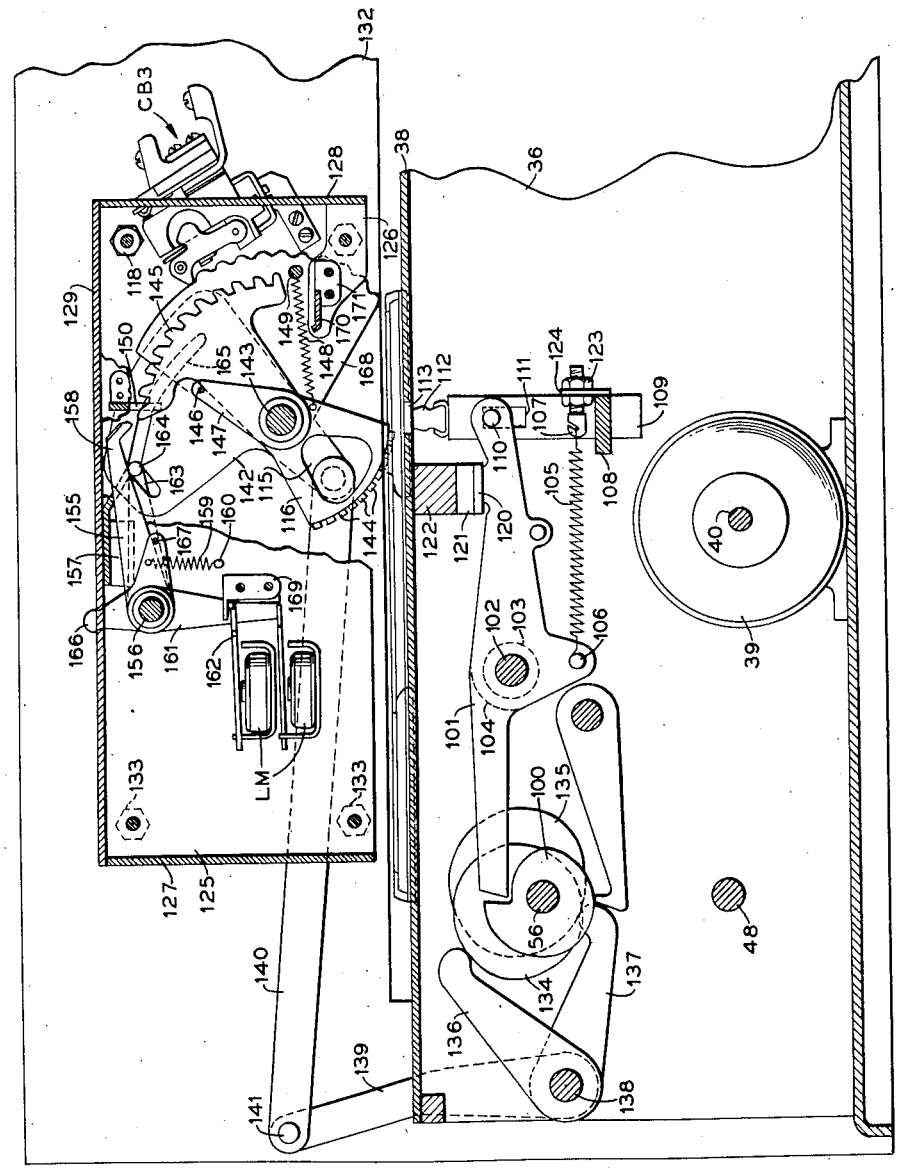
FIG. 4 is an elevational view of the printing and hammer mechanism.

The printing of data on the record card is accomplished by means of a cam controlled print hammer. Referring to FIG. 4, the main cam shaft 56 supports the cam 100 which has an associated hammer link 101 pivotally mounted on a shaft 102 which, in turn, extends between the front and rear plates 36 and 37. The hammer link 101 has integral therewith a collar 103 which is pivoted on shaft 102 and joined to a second link 104 pivoted on shaft 102. The link 101 is normally urged counterclockwise against the periphery of cam 100 by a spring 105 extending between a stud 106, connecting said links 101 and 104, and a threaded anchor 107 fastened to a guide member 108. The guide member 108 is fastened between the front and rear plates 36 and 37.

The two links 101 and 104 embrace a printing hammer 109 and are connected thereto by means of a pin 110 which extends through a slot 111 in the hammer. The hammer 109 is slideable in the guide member 108 and has mounted on its top edge a platen 112 which extends along an opening 113 in the top plate 38. The hammer 109 is moved upward with the platen 112 driving the record card against an inked ribbon 114 (see also FIG. 3) and the type sectors 115 and 116 each time that the hammer link 101 drops off the high dwell of cam 100, said cam 100 making one revolution each time that the motor contacts 80 are closed as previously described. The upward blow is cushioned by means of a shoulder 120 on the hammer links 101 and 104 contacting a rubber block 121 attached to bar 122 which extends between the front and rear plates 36 and 37. The strength of impression of the hammer may be adjusted to compensate for varying thicknesses of the record card by adjusting the threaded anchor 107 to which the tension spring 105 is attached. The lock nut 123 positions and retains the anchor in the plate 124 which forms a part of the guide member 108.

The sector mechanism is housed within a box-like structure which is supported above the top plate 38. The structure comprises a front plate 125, a rear plate 126 (see also FIG. 3), two side plates 127, 128 and a top plate 129. Plates 125 and 126 are positioned by threaded spacers 130 (FIG. 3) which are fastened to the rear plate 126 by screws 131, and the entire structure is supported on the front wall 132 of the recorder casing by means of screws 133.

The operation of the printing sector mechanism is under control of a pair of complementary cams 134 and 135 (FIG. 4) fastened on the main cam shaft 56 of the recorder. When shaft 56 is caused to make a revolution, as previously described, said complementary cams will act upon a pair of associated follower arms 136 and 137 fastened on a shaft 138 journaled in the front and rear plates 36 and 37 to cause said shaft 138 to oscillate, first in a clockwise direction and then in a counterclockwise direction. Fastened to the shaft 138 is a lever 139 which is connected to a driving link 140 by means of a stud 141. The other end of driving link 140 is fastened to a cam member 142 which is fastened on a sector shaft 143 journaled in the front and back plates 125, 126, and as a result, shaft 143 will oscillate with shaft 138.

Pivotally mounted on shaft 143 are two type sectors 115 and 116 for printing the number of axles in error in column 22 (see FIG. 2) and the number of reverse axles in column 21, respectively. Each of these sectors contains a series of ten type elements 144 for printing the numerals 0–9 inclusive, as will be described in detail shortly. The upper portions of sectors 115 and 116 each contain a series of ten ratchet tooth spaces 145 which are used, as will presently be seen, to selectively position a desired type element 144 at the printing station above platen 112. In normal position, the sectors are urged counterclockwise against a bail 146 fastened to a bail link 147 which is fixed to shaft 143, by means of springs 148 extending between the sectors and a stud 149 fastened between the front and back plates 125 and 126. It may be seen, then, that during the rotation of main cam shaft 56, the link 140 and cam member 142 will rotate shaft 143, bail link 147 and the sectors 115 and 116 first in a counterclockwise direction and then in a clockwise direction, the ratchet portions having tooth spaces 145 moving through slots in a guide plate 150 fastened between the front and rear plates 125 and 126.

The mechanism for selectively positioning the sectors for printing comprises latch levers 155, one for each sector, pivotally mounted on a shaft 156 journaled in the front and the back plates 125 and 126. The levers are positioned along the shaft 156 by a comb member 157 so that the hooked end 158 of each one can act on the ratchet teeth of a corresponding sector. They are normally urged in a clockwise direction for engagement with the ratchet teeth in the sectors by springs 159 extending between the levers and a stud 160 fastened between the front and intermediate plates. The latch levers 155 have downwardly extending portions 161 of varying lengths which are notched at the bottom and which are each normally latched against related armatures 162 of latch magnets LM mounted in staggered relationship. In the latched position, as shown in FIG. 4, the hooked ends 158 of the latch levers 155 are clear of the ratchet teeth in the print sectors due to the engagement of the armatures 162 and related extended portions 161.

Fastened on the shaft 156 is an arm 163 having a stud 164 which rides in a cam slot 165 in the cam member 142. The cam slot 165 is arranged so that the oscillation of shaft 143 and the cam member 142 is imparted to shaft 156 through arm 163. Also fastened on the shaft 156 is a bell crank lever 166, the lower arm of which has fastened thereto a stud 167 which extends underneath all of the latch levers 155. The upper arm of bell crank lever 166 extends through a slot in top plate 129 and is used to actuate the ribbon feed mechanism.

The operation of the selector mechanism is under control of a circuit breaker cam 168 fastened on shaft 143 and having a series of nine lobes on its periphery which function to open and close a pair of associated circuit breaker contacts mounted in a conventional circuit breaker unit CB3 attached to the front plate 126. As will be more clearly understood in connection with the circuit description of the toll recorder, the counters in the machine receive manually settable axle count pulses and axle treadle pulses. When the toll recorder is conditioned to take a print cycle, the main cam shaft 56 will make one revolution, as previously described, during which time the sector shaft 143 will be driven first in a counterclockwise direction (FIG. 4) and then in a clockwise direction through the driving link 140 and the cam member 142. As shaft 143 moves counterclockwise, the bail link 147 print sectors 115 and 116 and circuit breaker cam 168 will also move counterclockwise with the circuit breaker cam closing cam contacts CB3 to direct impulses to a counter in the toll recorder. Each sector will continue to follow the bail link 147 until its related latch magnet LM receives an impulse from the related counter, which occurs when said counter reaches zero, as will be shown later in connection with the circuit diagram. Energization of a latch magnet LM will draw the related magnet armature 162 downwardly to thereupon unlatch the latch lever 155. Latch lever 155 will then be spring moved clockwise into engagement with the proper notch in the related sector ratchet thereby stopping further movement of the sector with bail 146. Hence, the type element 144 in position for printing will represent the number which had been stored in the corresponding counter, as will appear more clearly when the circuit diagram is described.

It will be noted that as cam member 142 moves counterclockwise, arm 163 will cause shaft 156 to rotate clockwise carrying with it bell crank lever 166. As a result, stud 167 on bell crank lever 166 is moved away from the latch levers 155 leaving them free to be pivoted into engagement with the ratchet sectors. A slotted guide bracket 169 is fastened between the front and intermediate plates 126 and 127 to guide the lower portions 161 of latch levers 155.

After the bail link 147 reaches the limit of its counterclockwise movement and all of the sectors have been positioned, the printing hammer 109 is tripped off, as previously described, and a recording is made. Any of the sector plates that were not required to be stopped by the latch levers 155 will be stopped by projecting fingers 170 on a stop bracket 171 fastened to the front plate 126. At the end of the printing cycle, the complementary cams 134 and 135 will cause the sector shaft 143 to commence rotating in a clockwise (FIG. 4) direction. As cam member 142 begins to rotate clockwise, arm 163 will pivot shaft 156 counterclockwise and the stud 167 on bell crank lever 166 will lift all of the latch levers clear of the ratchet teeth on the print sectors. The bail link 147 will restore all of the sector plates back to their home position and the shaft 143 will carry the circuit breaker cam 168 back to its home position. The extended portions 161 of latch levers 155 are latched back on the armatures 162 of the latch magnets LM when levers 155 are pivoted clear of the ratchet teeth in the sectors.

*Axle Select Lever Print Mechanism*

Figure 5:
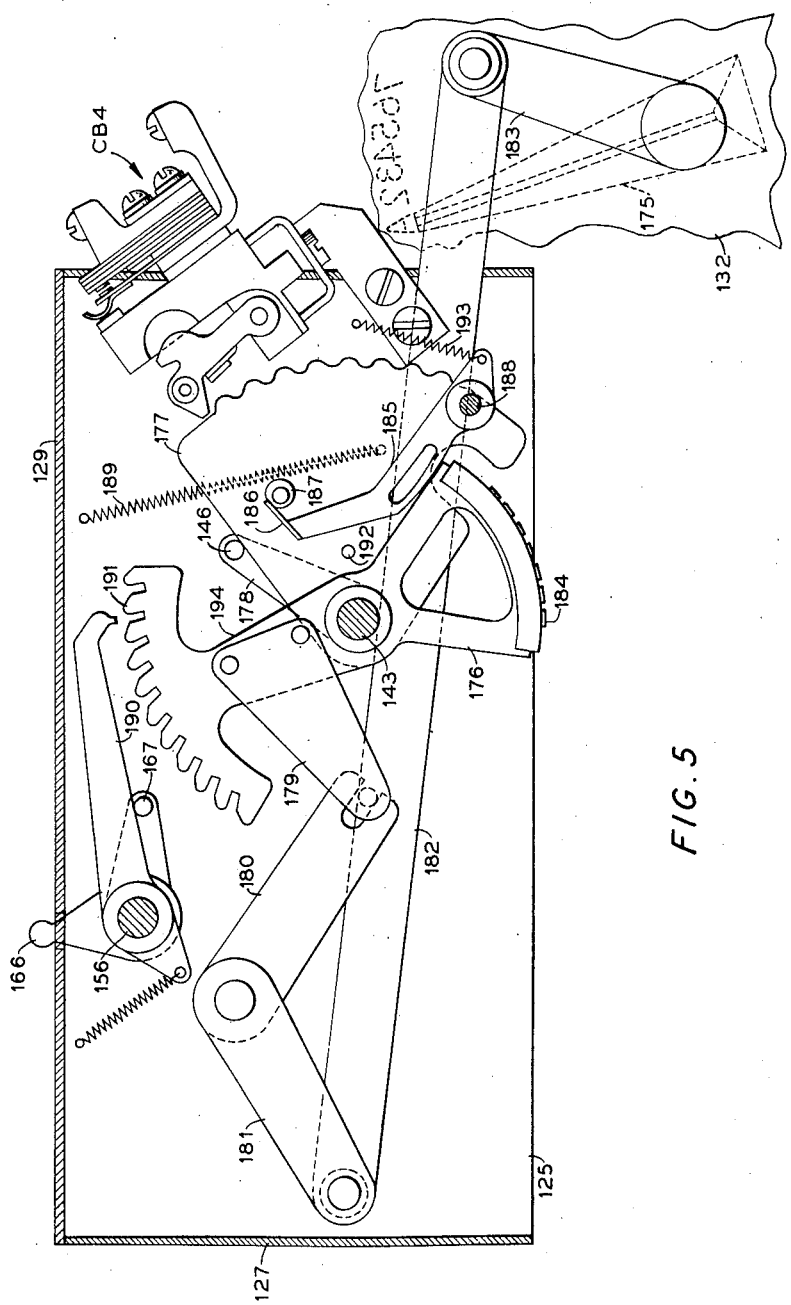
FIG. 5 is a view of the manually settable axle count printing mechanism.

Referring to FIG. 5, axle select lever 175 which is mounted for movement on front wall 132 is manually set by the toll collector to correspond with the number of axles on the vehicle being checked. Said lever may be set to any position A through 7 shown.

Axle selector print sector 176 for printing the number of axles selected in column 20 (FIG. 2), and variable cam 177 (see FIG. 5) are each loosely mounted on shaft 143. Bail link 178, to which bail 146 is attached, is the counterpart of bail link 147 (see also FIG. 4) and is fixed to shaft 143 for movement therewith. As is shown, sector 176 is connected to lever 175 via links 179 through 183 so that as the lever is moved in a direction from position A towards position 7, the sector 176 is moved a corresponding distance in a clockwise direction. The sector contains a series of seven type elements 184 for printing the symbols A, and 2 through 7.

As mentioned previously, the toll collector on duty must process an attendance card at the beginning and at the end of a tour of duty. For this operation, lever 175 is set to position A. This causes print sector 176 to be positioned at the counterclockwise limit in order that the type element 184 for printing the character A is in printing position. In this position, sector 176 engages lock lever 185 in order to move the latter into a position whereat projection 186 engages eccentric pin 187 attached to variable cam 177. Lock lever 185 is loosely mounted on stud shaft 188 which is fixed to, and projects from, back plate 126 (see FIG. 3).

As described previously, during a toll recorder operation shafts 143 (see FIGS. 4 and 5) and 156 first move in counterclockwise and clockwise directions, respectively. Due to the fact that projection 186 engages pin 187, spring biased cam 177 is prevented from following bail 146 under the urging of spring 189. Consequently, cam contacts CB4 are not operated to control count impulses to the axle control accumulator. The projected end of latch lever 190 is caused to seat in a notch in ratchet section 191 of sector 176 when bell crank lever 166 is moved. This, of course, locks sector 176 in a printing position during the time of the printing stroke so as to assure good printing.

In a normal vehicle trip card processing operation, lever 175 is set to a position corresponding to the number of axles determined to be on the vehicle being checked by the toll collector. For example, if it is determined that such a vehicle has three axles, lever 175 is set to position 3 in order to move sector 176 to a position whereat the type element 184 for printing a "3" in the axles selected column 20 (see FIG. 2) is at the printing station. Since sector 176 is moved out of engagement with lock lever 185, the latter is moved against stop pin 192 under tension of spring 193 to thereupon disengage projection 186 and pin 187. Operation of the toll recorder causes variable cam 177 to follow bail 146 in its counterclockwise movement until pin 187 touches the shank portion 194 of sector 176. The arrangement of parts is such that the cam contacts CB4 are operated a number of times equal to the tens complement of the axle count represented by the position of lever 175. Thus, assuming lever 175 is set to position 3, seven pulses are directed from cam contacts CB4 prior to pin 187 engaging sector shank 194.

During the return movement of shaft 143, after printing, bail 146 acts upon cam 177 so as to return the same to its home position.

*Power Failure—Weighted-Treadle Print Mechanism*

Figure 6:
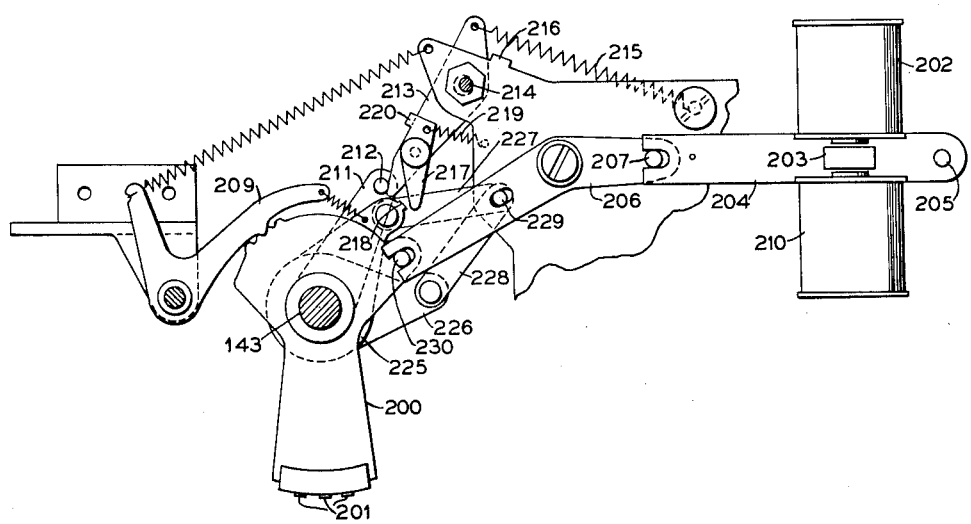
FIG. 6 is a view of the printing sector mechanism for recording power supply interruption and weighted treadle conditions.

A sector 200 for printing in column 23 (FIG. 2) of the trip card the letter P to indicate a power failure, the letter T to indicate a weight upon the treadle, and the letter O to indicate normal operation, is shown in FIG. 6. As to be brought out more in detail hereinafter, the first toll recorder operation after a power interruption, i.e., after the application of power thereto effects the printing of a "P," whereas every toll recorder operation effected during the time a treadle is weighted results in the printing of a "T." The first recorder operation after the weight is removed from the treadle also causes the printing of a "T."

As is shown in FIG. 6, sector 200 is freely mounted on shaft 143 for movement whereby a selected one of the type segments 201 thereon is brought into alignment with printing platen 112 (see also FIG. 4) to print an "O," "P" and "T." Assuming the "T" latch magnet 202 is energized in an electric circuit to be described subsequently, armature 203 is attracted thereto by the resulting electromagnetic field. In view of armature 203 being connected to arm 204 which is free to pivot about pin 205, and since arm 204 is connected to bell crank 206 at stud 207, sector 200 is caused to move in a clockwise direction when the bifurcated end of bell crank 206 acts upon stud 230. Member 209 acts upon sector 200 so as to detent the latter.

Assuming that "P" latch magnet 210 is energized by electric means to be described, sector 200 is caused to move in a counterclockwise direction about shaft 143 so that the left-hand type segment 201 is opposite the printing platen.

After either a power failure condition or a weighted-treadle condition is corrected, the magnet energized as a result thereof, is de-energized. Sector 200 is maintained in position by member 209 until a toll recorder operation. During this operation, reset link 211 which is fixed to shaft 143 and reset bail 212 which is connected to link 211, rock with shaft 143. During substantially the first half of the toll recorder machine cycle, reset link 211 is moved in a counterclockwise direction to thereby permit follower arm 213 to pivot about eccentric 214 in a clockwise direction under the urging of spring 215. The limit of movement of arm 213 in this direction is reached when follower arm 213 engages L- shaped stop 216. This movement is sufficient to carry spring biased member 217 to the left of projection 218. As is shown in FIG. 6, spring 219 biases pivoting member 217 so that L-shaped stop 220 engages arm 213.

During substantially the latter half of a toll recorder machine cycle, reset link 211 is moved in a clockwise direction whereupon bail 212 engages the lower end of arm 213 for movement therewith and member 217 engages the left side of projection 218 which is a part of link 225. This link and link 226 are loosely arranged on shaft 143, and are each pivotally attached to arms 227 and 228, respectively, which, in turn, are interconnected by pin 229. Hence, member 217 causes links 225 and 226 to move, or "squeeze," together in a scissors action, whereby link 225 moves in a clockwise direction and link 226 moves in a counterclockwise direction. This movement causes the links to center pin 230 therebetween. Pin 230 being connected to sector 200 causes the latter to be restored to a central home position in which the middle type segment 261 for printing an "0" is aligned with the platen.

Operational Circuits

*General description.*—Referring to FIG. 8a, suitable electrical alternating current power, e.g., 115 volts, is directed from source 235 to lines 236 and 237. Similarly, direct current power, e.g., 48 volts, is directed from source 244 to lines 245 and 246.

As is shown, synchronous timing motor 91 (see also FIG. 3) is operated continuously so long as the toll recorder is connected to source 235, and thereby causes cam 93 to rotate at a speed of one revolution per minute. Accordingly, cam contacts 94 are closed once each minute to complete a circuit to time control solenoid 240. This solenoid which is represented as solenoid 40 in FIG. 3 of Rast Patent No. 2,281,998, operates a clutching means to connect a drive motor to a time indicating type wheel unit for printing the time in column 18 (FIG. 2) of the trip card. The type wheel unit consists of a minute wheel, an hour wheel and an A.M.-P.M. wheel, each of these wheels being advanced at the proper time. Inasmuch as the time apparatus is described in detail in the afore-mentioned Rast patent, and since this apparatus is not an essential feature of the instant invention, the said apparatus will not be described herein any further in order to avoid undue complexity and prolixity.

Referring to FIG. 8a once again, insertion of a trip card into the card receiver of the toll recorder engages card lever 224 (see also FIG. 3) which closes card contacts 241 to complete a circuit to card hold solenoid 242 from line 236 through relay contacts R12b, R11b, R10a, R8b, R5b, card contacts 241, card hold solenoid 242, to the other side of the line. Energization of solenoid 242 operates a card hold lever (not shown) for gripping the trip card so that the latter cannot be removed from the card receiver until after the card processing operation is completed. Solenoid 242 also closes contacts 243 through a suitable mechanical means (not shown) so as to energize clutch solenoid 65 (see also FIG. 3). This sequence of operation assures the proper insertion and retention of the trip card in the card receiver prior to the start of the recorder print cycle. As described hereinbefore, energization of clutch magnet 65 causes a single toll recorder print operation to take place.

*Forward counter operation.*—Referring to FIGS. 8b and 8c, when a wheel attached to an axle passes over treadle 15 (see also FIG. 1) in a forward direction, forward contacts 261 and reverse contacts 262 are closed and opened in succession to thereupon enter a single axle count into forward axle counter 253. As will be described shortly, in order to enter an axle count into this counter, it is necessary for contacts 261 to close first, contacts 262 to close before contacts 261 open, and contacts 262 to open last.

Assuming a single axle of a vehicle is passing over the treadle in a forward direction, forward contacts 261 are closed first to complete a circuit to relay R16 (FIG. 8b). The energization of relay R16 causes a circuit to be completed to relay R17 from line 245 through contacts R16a, R14c normally closed (N/C), relay R17, to line 246. This forms a hold circuit for relay R17 from line 245 through contacts R16c, R17b and R14c N/C.

Relay R13 is energized when reverse contacts 262 in treadle 15 are closed. The closing of contacts R13c completes a second hold circuit for relay R17 from line 245 through contacts R13c, R17b and R14c N/C. It is to be observed that had relay R16 been de-energized prior to the energization of relay R13, relay R17 would have been de-energized when the hold circuit therefor including contacts R16c, opened.

Further movement of the vehicle in a forward direction permits contacts 261 to open so as to cause relay R16 to de-energize. This allows a circuit to form to energize relay R18 from line 245 through contacts R13a, R17c normally opened (N/O), R16d, relay R18, to the other side of the line. A hold circuit is immediately formed from line 245 through contacts R3b, R18a and R16d.

The complete passage of the vehicle over the treadle in a forward direction allows contacts 262 to open after forward contacts 261 opened to thereupon effect de-energization of relay R13. Hence, relay R3 is energized from line 245 through contacts R13b, R16b, R18d, relay R3, to line 246. This causes contacts R3b to open, whereupon the hold circuit to relay R18 is disrupted, and the latter relay is caused to drop out. This action, in turn, causes contacts R18d to open so as to de-energize relay R3.

Referring to FIG. 8c, it may be seen that forward counter magnet 255 is pulsed once when contacts R3a are caused to close; that is, a circuit is completed from line 245 through contacts R3a, R6d, magnet 255, to the other side of the line.

Forward and reverse counters 253 and 247, respectively, each are of the step-by-step operated type described in Lake et al. Patent No. 2,480,744. The counters used in the instant embodiment are somewhat modified versions of the Lake accumulator. For example, a spring is used to return the armature (armature 23 in FIG. 1 of the Lake patent) instead of a magnet (magnet 22 in FIG. 1 of the Lake patent). However, in view of the fact that the counters used in the toll recorder are substantially the same as the one described in the Lake patent, and since the counters per se are not a feature of this invention, they will be described only briefly herein.

Referring to forward counter 253 shown in FIG. 8c, each time magnet 255 is impulsed, emitter arm 233 is caused to move in a counterclockwise direction from one commutator segment 234 to the next. Also, when arm 233 engages segment 258, a count of five axles is indicated in counter 253. The apparatus to secure the representation of the axle count standing in a counter, such apparatus as emitter arm 233, commutator segment 258, and associated circuitry, for example, is, of course, well recognized to be the counter readout means.

Similarly, every time magnet 249 is impulsed, emitter arm 231 is moved in a counterclockwise direction from one commutator segment 232 to the next segment. When arm 231 engages segment 252, a count of nine axles in the reverse direction is indicated in reverse counter 247.

Each counter includes three cams which move in step with the emitter arms 231 and 233 as the counters are advanced step-by-step. These cams operate upon contacts 254, 256 and 257 in counter 253, and upon contacts 248, 250 and 251 in reverse counter 247. The arrangement is such that contacts 248, 251, 254 and 256 are open only when their respective counters 247 and 253 are standing at zero. Contacts 250 and 255, on the other hand, are closed only when the related counters stand at nine.

*Reverse counter operation.*—Provision is made in the instant toll recorder to also count axles passing over treadle 15 in a reverse direction. That is, a single reverse axle count is entered in reverse counter 247 in response to each axle wheel causing contacts 262 (FIG. 8b) and 261 to close and open in succession.

Relay R13 is energized first when contacts 262 are closed. This causes a circuit to be completed to relay R14 from line 245 through contacts R13a and R17c N/C. A separate hold circuit is then completed from line 245 through contacts R13c, R14b and R17c N/C.

Further movement of the vehicle in a reverse direction closes contacts 261 to thereby complete a circuit to relay R16. Relay R16 being energized prior to R13 becoming de-energized causes a hold circuit to relay R14 to be completed from line 245 through contacts R16c, R14b, and R17c N/C. Upon the de-energization of relay R13 when treadle contacts 262 are caused to open a circuit is completed to relay R15 from line 245 through contacts R16a, R14c N/O and R13d. A parallel hold circuit is completed from line 245 through contacts R4b, R14b and R13d. When the vehicle is moved in a reverse direction so as to be completely off treadle 15, relay R16 is de-energized due to contacts 261 being allowed to open. The de-energization of relay R16 causes a circuit to be completed to relay R4 from line 245 through contacts R13b, R16b and R15b. Hence, referring to FIG. 8c, reverse counter magnet 249 is impulsed to add a count of one when contacts R4a close through a circuit from line 245, contacts R9d and R4a, magnet 249, to the other side of the line.

Referring once again to FIG. 8b, the energization of relay R4 causes the de-energization of relay R15 when contacts R4b open. In turn, the de-energization of relay R15 causes the de-energization of relay R4 when contacts R15b open.

*Normal toll recorder operation.*—With reference to FIG. 1, axle selection lever 175 (see also FIG. 5) is set as mentioned hereinbefore by the toll collector who is checking a vehicle stopped opposite toll booth 12 to a position indicating the number of vehicle axles on the vehicle. After so setting lever 175, a trip card is inserted into the card receiver of the toll recorder to cause drive motor 39 (see FIGS. 3 and 8a) to operate the drive mechanism as described previously under the heading Drive Mechanism.

During the first half of the recorder cycle, cam contacts CB1 close from 5° to 160° (see FIG. 7) so that reset cam CB3 directs 9 reset impulses to forward counter 253. As is shown in the timing chart in FIG. 7, cam contacts CB1 are closed from 5° to 160° so that cam contacts CB3 are effective only during the counterclockwise movement of variable cam 168 (FIG. 4) during substantially the first half of the recorder cycle. Since contacts 254 (FIG. 8c) are open only when counter 253 is standing at zero, the afore-mentioned reset pulses will be directed to counter magnet 255 only if forward counter 253 contains a value other than zero through a reset circuit including line 245, contacts CB1, CB3, R1b, tens contacts 248, magnet 249, and the other side of the line. Assuming, for example, counter 253 to contain a two axle count from the previous toll recorder operation, eight reset impulses will be directed to magnet 255 before contacts 254 are caused to open the reset circuit.

It may be seen that the same reset impulses are directed to reverse counter magnet 249 from line 245 through contacts CB1, CB3, R1b, tens contacts 248, magnet 249, to line 246. Contacts R1b are closed from 5° to 160° because relay R1 is controlled by cam contacts CB1. As with counter 253, contacts 248 are caused to open when counter 247 is standing at zero.

Assuming counter 253 to contain a zero axle count from the previous toll recorder operation, magnet 255 will not be energized due to the reset impulses due to the fact that contacts 254 are open. Hence, the print sector 116 (see also FIG. 4) associated with counter 253 will follow bail 146 to the limit of movement in a counterclockwise direction, whereby the last, i.e., the zero, type element 144 is at the printing station. Similarly, assuming a zero axle count in reverse counter 247, magnet 249 thereof is not energized by the reset impulses due to open contacts 248. Accordingly, type sector 116 associated with counter 247 will move to the limit of movement in a counterclockwise direction to thereby align the zero type segment with the platen.

At substantially the mid-point of the print cycle a print stroke is effected whereby, among other items of information, a zero is printed in reverse axles column 21 (see FIG. 2), a zero axle count is printed in error axles column 22, and the axle count of the vehicle at the toll booth is printed in axles column 20 from the type sector which is set mechanically by the axle selection lever.

Figure 7:
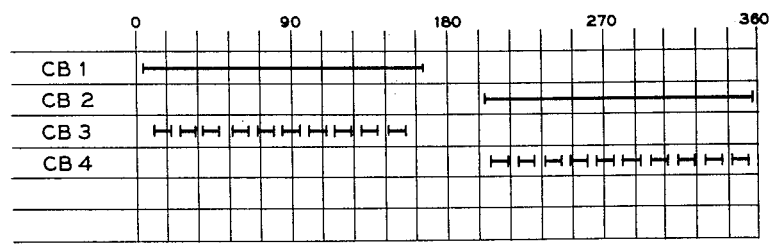
FIG. 7 is a timing chart.

After printing the afore-mentioned information upon the trip card, cam contacts CB4 (see FIGS. 5 and 8c) direct a number of impulses to forward counter magnet 255, wherein the so-called subtractive impulses equal the tens complement of the number to which the axle selection lever 175 is set. That is, assuming the axle selection lever to be set in the two axle position, eight impulses are directed from line 245 through contacts CB2, CB4, tour of duty contacts 259, magnet 255, to line 246. With reference to FIG. 7, it may be seen that cam contacts CB4 (see also FIG. 5) are ineffective during the first half of the toll recorder cycle when variable cam 177 is caused to move in a counterclockwise direction, because cam contacts CB2 are open. Contacts CB4 are effective during the second half of the toll recorder cycle when variable cam 177 is moved in a clockwise direction because cam contacts CB2 are closed from 200° to 355°.

As the vehicle leaves the toll booth, each axle crossing the treadle in a forward direction causes an impulse to be directed through the directional relay circuit described hereinbefore to thereby energize forward counter magnet 255. If the toll collector set the axle selection lever in a position indicative of the correct number of axles on the vehicle, the axle counts directed to forward counter 253 during the time that the vehicle is passing over the axle treadle should return the counter to zero.

As a result, when the next vehicle arrives at the toll booth, a zero will be printed in the error and reverse columns 22 and 21, respectively, of the trip card.

*Reverse axles count.*—As described hereinabove, axles crossing the treadle in a reverse direction will be counted by reverse counter 247. Any count appearing in the reverse counter will be printed on the trip card during the toll recorder cycle that the counter is returned to zero. This operation is similar to the forward counter operation. Assuming that a two axle vehicle passed over the treadle in a forward direction prior to passing over the treadle in a reverse direction, relay R4 will be energized twice, whereupon two impulses will be directed to reverse counter magnet 249. Thus, during the first half of a print cycle, reset impulses will be directed through contacts CB3 and R1B and 248 to magnet 249 so as to advance the counter to zero. However, at the time the counter is standing at 9, contacts 251 are closed so as to complete a circuit to latch magnet RLM from line 245 through contacts CB1, CB3, R1B, 248, 251, R1C, magnet RLM, to the other side of the line. Referring to FIG. 4, as described previously, the energization of latch magnet RLM will release latch lever 155 associated therewith so that projection 158 thereon will engage a notch 145 of type sector 116 to thereby align the two type segment 144 with platen 112.

Of course, during the toll recorder cycles, when there is no count in the reverse counter, contacts 248 will be open and type segment 116 will be permitted to move in a counterclockwise direction so as to align the type segment 144 with platen 112.

*Forward axle error operation.*—Assuming that the toll collector sets the axle selection lever to a two axle position for a vehicle having three axles, a count of eight will be entered into counter 253 during the toll recorder cycle in which the trip card associated with the vehicle is processed. When the vehicle is permitted to leave the booth to pass over the treadle in a forward direction, the afore-described treadle circuit will direct three impulses to forward counter magnet 255. Hence, the counter will advance through zero to a one. During the following toll recorder operation for the next vehicle arriving at the toll booth, nine reset impulses will be directed through cam contacts CB3 and tens contacts 254 to reset the counter from a one to a zero. The eighth impulse advances the counter to a nine of course, at which time contacts 257 are caused to close so as to energize latch magnet FLM from line 245 through contacts CB1, CB3, 254, 257, R1A, magnet FLM, to line 246. In view of the fact that the type sector 116 (see also FIG. 4) which prints in the error column of the trip card and which is associated with forward counter 253, moves in unison with the reset impulse cam for controlling contacts CB3, this type sector is stopped by a latch lever 155 when latch magnet FLM is energized to align the "−1" type symbol 144 with the platen. Hence, a "−1" will be printed on the trip card in error column 22 (FIG. 2) to indicate that the axle selection lever was set to a number of axles fewer than the actual number determined by the treadle.

Assuming that the toll collector sets the axle selection lever to a three axle position for a vehicle having two axles, the counter will stand at a nine after the vehicle crosses the treadle in a forward direction. This, of course, is due to the seven reset impulses directed through cam contacts CB4 and two treadle counts. Hence, during the following toll recorder cycle, the first reset impulse directed through cam contacts CB3 will energize latch magnet FLM as well as counter magnet 255. This will release latch lever 155 to align the first type segment 144 with the platen to print a "+1." The plus error will indicate that the axle selection lever was set to a number of axles greater than the actual number passing over the treadle.

*Ten-axle control.*—It may be observed that the entry of ten axle counts or any multiple of ten axles, into either the forward counter 253 or the reverse counter 247 will return the counter to zero. Consequently, fraudulent acts could normally be precipitated quite easily. To prevent any fraudulent acts of this type, a ten-axle control feature is provided to indicate and record an attempt to enter a ten or greater axle count into either the forward or reverse counters. This is acomplished by providing for only a maximum five axle count to be entered in forward counter 253, and only a maximum nine axle count to be entered into reverse counter 247. Thus, if the unauthorized operation of the treadle circuit by vehicles passing the toll booth without having trip cards processed, advances the forward counter to at least a maximum of five axles, or the reverse counter to at least a maximum of nine axles, a tens-axle error will be detected and recorded. The maximum axle counts, i.e., five or nine, will remain in the respective counters until the first toll recorder operation following their entry. During this operation, a five will be printed in error column 22 (FIG. 2) and a nine will be printed in reverse column 21.

Axles crossing the treadle in a forward direction will cause relay R3 to become energized once for each axle. Thus, an impulse for each forward axle will be directed to magnet 255 when contacts R3A close. When the axle bringing the counter to a five passes over the treadle, emitter arm 233 is caused to engage commutator segment 258. This completes a circuit to relay R6 from line 245 through contacts R2D, R7B, emitter arm 233 and segment 258, relay R6, to the other side of the line. This causes the circuit to counter magnet 255 to be interrupted when normally closed contacts R6D are open. Thus, any additional axles crossing the treadle will not be counted.

When the next trip card is inserted in the card receiver of the toll recorder so as to initiate a toll recorder operation, a five will be printed in the error column of the trip card. This will indicate either a legitimate error of five axles or an attempted fraud caused by vehicles passing the treadle in a forward direction.

During normal operation of the toll recorder when the axle selection lever is set to the two, three or four axle positions, impulses directed through contacts CB4 will cause the counter 253 to advance past the five position. The ten-axle control circuit is ineffective during this part of the toll recorder cycle because relay R2 is energized from 200° to 355° while contacts CB2 are closed. This causes contacts R2D to open, and to thereby prevent a circuit to form to ten-axle control checking relay R6.

Relay R7 (FIG. 8a) is also energized when relay R2 is energized, and is maintained energized as long as there is a count in forward counter 253. Relay R7 is energized through contacts R2A. Relay R7 is maintained energized through contacts R5C and R7A. Referring to FIG. 8c, contacts 256 are caused to open only when counter 253 is at zero. As a result, relay R5 is energized so long as counter 253 is not standing at zero. The circuit for relay R5 is from line 245, contacts 256, relay R5, to line 246. Since counter 253 does not have a zero until after the vehicle has passed over the treadle (during normal operation) the circuit to relay R6 is inoperative until after the vehicle has completely crossed the treadle.

In the event that nine or more axles are caused to pass over the treadle in a reverse direction, emitter arm 231 (FIG. 8b) is caused to engage commutator segment 252 when the ninth axle count is entered into reverse axle counter 247. This causes a circuit to be completed to relay R9 from line 245 through contacts R2D, arm 231 an dsegment 252, relay R9 to the other side of the line. This, in turn, causes contacts R9D to open the circuit to counter magnet 249 so that no additional magnet counts are entered into counter 247.

When the next trip card is inserted into the card receiver of the toll recorder, a nine will be printed in the reverse error column 21 (see FIG. 2). This will indicate either a legitimate number of nine axles passing over the treadle in a reverse direction or an attempted fraud by several vehicles passing over the tread in this direction.

*Power failure circuit.*—The toll recorder will indicate a power failure by causing a character P to be printed in column 23 of the trip card (see FIG. 2) during the first toll recorder operation effected after the power failure.

When the power applied to lines 245 and 246 is interrupted, relay R10 (FIG. 8c) is de-energized. When the power is restored to the aforesaid lines, a circuit is completed to magnet 210 (FIG. 8a) through contacts R10B. Referring to FIG. 6, as described previously, energization of magnet 210 effects a movement of type sector 200 so that the type symbol 201 having a P configuration thereon is brought into alignment with the printing platen. Thus, during the toll recorder printing stroke, type sector 200 will be restored to its home position after printing a P, and relay R10 (FIG. 8c) will be energized during the second half of the toll recorder cycle when contacts R2D are closed. Relay R10 will remain energized as long as power is maintained on lines 245 and 246 through its stick contacts R10C.

*Treadle time delay circuits.*—The purpose of the treadle time delay circuit is to afford means for indicating when the treadle contacts 261 and/or 262 have been held closed for a period longer than a predetermined time. This is a safeguard against what is commonly referred to as "sandbagging" the treadle. Referring to FIG. 8b, the energization of relays R16 and/or R13 completes a circuit to a heating coil resistor 263 from line 245 through contacts R16C and R11D, and/or contacts R13C, R11D, heater resistor 263, to the other side of the line. Resistor 263 is arranged on a bi-metal contact strap R12C (see also FIG. 8a). The bi-metal contact R12C is caused to close as a result of a continuous current for a predetermined time through heater coil resistor 263. The length of time required to close the contact is adjustable from approximately five seconds to twenty seconds.

When contacts R12C are closed, relay R12 and magnet 202 are energized therethrough, and are maintained energized through contacts R12A. As described previously with reference to FIG. 6, energization of magnet 210 causes sector 200 to be moved so that the type segment 210 having a T configuration thereon is brought into alignment with the printing platen. Relay R11 is energized when relay R12 is energized, from line 245 through contacts R2D, R12D, relay R11, to line 246. Relay R11 is maintained energized by hold circuit from line 245, through contacts R2D, R11C, relay R11, to line 246. This causes contacts R11D (FIG. 8b) to open in order to interrupt the circuit to resistor 263 so as to prevent the possibility of overheating or burning the resistor as a result of a sustained treadle delay.

*Indicating light circuits.*—Referring to FIG. 8a, light 265 is lit as long as relay R5 (see also FIG. 8c) is energized. Since relay R5 is energized as long as counter 253 does not contain a zero, light 265 indicates the same when energized.

In view of the fact that light 266 is energized when contacts R11A are closed, and since relay R11 (see also FIG. 8c) is energized in consequence of a treadle time delay, light 266 is to indicate a treadle time delay.

The purpose of light 267 is similar to that for 265 in that light 267 is lit whenever reverse counter 247 is standing at a value other than zero. It will be recalled that relay R8 is energized through contacts 250 whenever counter 247 is at a value other than zero.

Light 268 is energized whenever relay R10 is de-energized. Consequently, as explained hereinabove, light 268 is lit after a power failure and prior to the first toll recorder operation after the said failure.

*Start control circuit.*—Full insertion of a trip card into the card receiver of a toll recorder will cause contacts 241 to close as described previously. However, a toll recorder operation may not be effected automatically for the following reasons:

(1) Contacts R5B (FIG. 8a) when open indicate that forward counter 253 (see also FIG. 8c) contains a value other than zero.

(2) Contacts R8B when open indicate that reverse counter 247 contains a value other than zero.

(3) Contacts R10A when open indicate that a power failure has occurred.

(4) Contacts R11B when open indicate that a weight is on the treadle causing contacts 261 (see also FIG. 8b) and/or 262 to close after a predetermined time interval.

(5) Contacts R12B when open indicate that the bi-metal contacts R12C are closed and are causing the energization of relay R12.

Hence, whenever one or more contacts R5B, R8B, R10A and R11B are open, it is necessary to depress error switch 269 so as to close the contacts thereof in order to complete a circuit to solenoid 242 from line 236 through contacts R12B, 269, 241, solenoid 242, to the other side of the line. However, if contacts R12B are open due to the fact that the bi-metal contact strap has not cooled sufficiently to open the circuit to relay R12 and magnet 210, depression of error switch 269 will not complete a circuit to solenoid 242 until after contacts R12B close. This is a safeguard to prevent an attempted restoration of type segment 200 (see FIG. 6) while solenoid 210 is still energized.

While there have been shown and described and pointed out the fundamental novel features of the invention as applied to a single modification, it will be understood that various omissions and substitutions and changes in the form and details of the device illustrated and its operation may be made by those skilled in the art without departing from the spirit of the invention. It is the intention, therefore, to be limited only as indicated by the scope of the following claims.

What is claimed is:

1. A toll highway recorder comprising an accumulator, a source of electrical power, a first and a second switch, a manually settable member having a plurality of positions each of which is indicative of a different first axle count, a first electric circuit including said first switch controlled by said member for connecting said accumulator to said source so as to effect a first axle count therein, an axle treadle controlled by vehicle axles passing thereover for controlling said second switch, a second electric circuit including said second switch for connecting said accumulator to said source so as to effect a second axle count therein, recording means, means including said recording means for effecting a recorder operation, means governed by said manually settable member for controlling said recording means during a first recorder operation prior to the passage of a vehicle over said treadle so as to record data representing said first axle count, and means governed by said accumulator for controlling said recording means during a second recorder operation after the passage of the vehicle over said treadle so as to record data representing a resultant of said first and said second axle counts.

2. A recorder according to claim 1 additionally comprising means controlled by said recorder operation effecting means for zero setting said accumulator during the second recorder operation.

3. In a toll highway recorder having means for effecting recorder operation, the combination of a vehicle axle error recording apparatus comprising a manually settable axle count representing mechanism, an axle treadle apparatus, an accumulator, first means controlled by said mechanism during a first recorder operation for directing a first axle data manifestation to said accumulator so as to store a first axle count therein, second means controlled by said axle treadle apparatus prior to a second recorder operation for directing a second axle data manifestation to said accumulator so as to store the resultant of said first and said second axle counts therein, and printing means operable under control of said mechanism during said first recorder operation to record data representing said first axle count for a vehicle and operable under control of said accumulator during said second recorder operation to record data representing the resultant of said first and said second axle counts for the vehicle.

4. An apparatus including an axle treadle located in a toll highway for recording data relating to vehicles passing over the toll highway comprising a manually settable mechanism for representing an axle count relating to a next succeeding vehicle to pass over said treadle, an accumulator, means controlled by said mechanism for causing a first axle count relating to the next succeeding vehicle to pass over said treadle to be entered into said accumulator, means controlled by said axle treadle for causing a second axle count relating to a last vehicle having passed over said treadle to be entered into said accumulator, manually operable means for effecting a single recording operation for each manual operation of said means, printing means operable under control of said manually settable mechanism during a first manually effected recording operation to record data representing an axle count relating to the next succeeding vehicle to pass over said treadle, and other printing means operable under control of said accumulator during a second manually effected recording operation to record data representing the resultant of the said first and the said second axle counts relating to the last vehicle having passed over said treadle.

5. An apparatus according to claim 4 additionally comprising an accumulator zero setting means, and other means so constructed and arranged as to control said preceding means during a second recording operation to zero set said accumulator prior to the entry of another first axle count therein.

6. In a toll highway recorder having an axle treadle apparatus, data storing means, means for effecting a recorder operation, means operative during a first recorder operation to cause entry of first axle count data into said storing means, means effective after the first recorder operation and controlled by said treadle apparatus to cause entry of second axle count data into said storing means, and means operative during a second recorder operation for recording data representing the resultant of said first and said second axle counts.

7. In a toll highway recorder having an axle treadle apparatus, data storing means, means for effecting a recorder operation of one cycle duration, means operative during a first recorder operation cycle to cause entry of first axle count data relating to a first vehicle into said storing means, means controlled by said treadle apparatus after said first and prior to a second recorder operation cycle to cause entry of second axle count data relating to said first vehicle into said storing means, means controlled by said data storing means operative during said second recorder operation cycle for recording third axle count data representing the resultant of said first and said second axle counts, and other means operative during said second recorder operation cycle to clear out said third axle count data stored in said storing means prior to the entry therein of a first axle count data relating to a second vehicle.

8. A toll highway recorder comprising an axle treadle apparatus, manually settable axle count representing mechanism, an accumulator, means for effecting recorder operation, means controlled by said mechanism to be operative during a recorder operation so as to cause entry into said accumulator of first axle count data relating to one vehicle, means controlled by said treadle apparatus after said recorder operation to cause entry into said accumulator of second axle count data relating to the said one vehicle, accumulator controlled means operative during the next following recorder operation for recording the resultant data representative of said first and said second axle counts, and other means operative during said next following recorder operation to zero set said accumulator for the entry therein during said latter recorder operation of first axle count data relating to another one vehicle.

9. In a toll highway recorder having an axle treadle apparatus, data storing means, means for effecting a recorder operation, means for setting up a first axle count, means controlled by said setting up means and operative during a first recorder operation to cause entry of first axle count data relating to a first vehicle into said storing means, other means controlled by said setting up means and operative during said first recorder operation to cause said first axle count data to be recorded upon a trip card, means controlled by said treadle apparatus after said first and prior to a second recorder operation to cause entry of a second axle count data relating to the first vehicle into said storing means, means controlled by said data storing means and operative during said record recorder operation to cause a third axle count data representing the resultant of said first and said second axle counts to be recorded upon a next following trip card.

10. A toll highway recorder having, in combination, a fraud recording device comprising an axle treadle, a treadle controlled switch so arranged as to be operated by axles passing over said treadle, an axle representing counter, a treadle controlled circuit including said switch for causing one axle count to be added to said counter in response to each axle passing over said treadle, counter readout means, checking means governed by said counter readout means and adapted to be operated when a predetermined axle count is entered into said counter, printing means, means controlled by said checking means for setting said printing means to a printing position indicative of the predetermined count, other means controlled by said checking means to inactivate said treadle controlled circuit so as to prevent the entry of additional axle counts in said counter, and means including said printing means for effecting a printing operation.

11. A recorder according to claim 10 additionally comprising counter zero setting means operative during a printing operation for resetting said counter to thereupon disable said checking means.

References Cited in the file of this patent

UNITED STATES PATENTS

| | | |
|---|---|---|
| 2,359,616 | Bryce | Oct. 3, 1944 |
| 2,469,655 | Leathers | May 10, 1949 |
| 2,480,744 | Lake et al. | Aug. 30, 1949 |
| 2,621,101 | Cooper | Dec. 9, 1952 |
| 2,644,150 | Burn | June 30, 1953 |
| 2,753,113 | Cooper | July 3, 1956 |